No. 799,669. PATENTED SEPT. 19, 1905.
E. S. REGNIER.
COMBINED CUTTING AND RAKING IMPLEMENT.
APPLICATION FILED JULY 27, 1905.
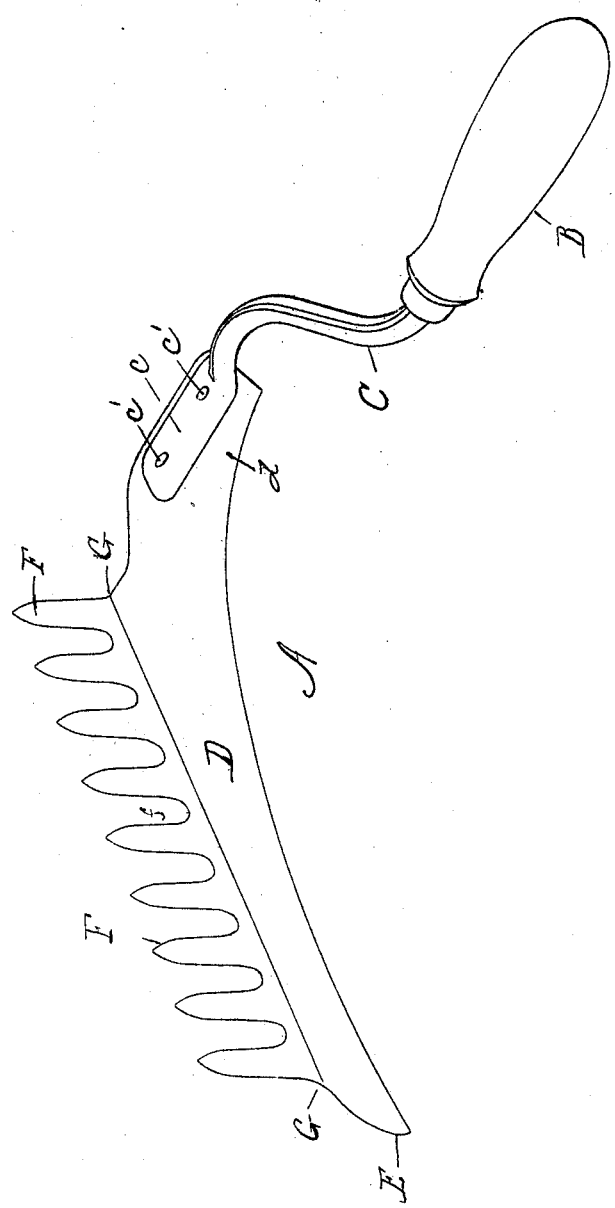
Witnesses:
C. S. Richards.
Harold Miller.
Inventor:
Eugene S. Regnier,
By H. M. Richards,
Atty.

UNITED STATES PATENT OFFICE.

EUGENE S. REGNIER, OF GALESBURG, ILLINOIS.

COMBINED CUTTING AND RAKING IMPLEMENT.

No. 799,669.  Specification of Letters Patent.  Patented Sept. 19, 1905.

Application filed July 27, 1905. Serial No. 271,424.

*To all whom it may concern:*

Be it known that I, EUGENE S. REGNIER, a citizen of the United States, residing at Galesburg, in the county of Knox and State of Illinois, have invented a certain new and useful Improvement in a Combined Cutting and Raking Implement, of which the following is a specification.

My present invention relates to implements for cutting or reaping grass, grain, weeds, &c., and particularly to that class thereof variously known as "sickles," "grass-hooks," "scythes," and "cradles;" and the improvement consists in providing the cutting-blade thereof with raking-teeth, so located with relation thereto that in the operation of cutting the grass or weeds the cut material, together with any refuse which may lie adjacent thereto, will be cast or thrown into windrows, and which cutting-blade may be reversed from its usual or ordinary cutting position and the implement used as a rake, while its point may be advantageously employed as a weed-extractor.

The objects of the invention, its uses, mode of operation, and practicability will be hereinafter set forth.

In the accompanying drawing, which illustrates my improvements as embodied in the best way now known to me and in which the device is shown in perspective, A represents a sickle or grass-hook having an ordinary handle B and shaft C, flattened at its distal end $c$ for fixment thereto of the heel $d$ of a cutting-blade D, having its point E extended a short distance beyond the teeth hereinafter described. Rivets $c'$ are here employed to effect a rigid union.

F represents raking-teeth located along the rear edge of the blade proper, project therefrom preferably at a right angle, and may be of any desired form, construction, and number. Also they may extend to a greater or lesser longitudinal degree than that shown.

While I have shown the rear edge or bend of the blade as continuing in a straight or right line, it will be evident that it may be curved or be of any conformation desired or preferred. In the event of the old-style curved blade being employed the metal may be expanded along its line of curvature, and teeth may be formed in a manner similar to that here shown. However, such process is an expensive one and the resultant tool inferior to one having a substantially straight blade.

The blade proper, D, and the teeth F may be integral, as shown, or they may be of separate pieces and welded, riveted, or otherwise fixed together. When made of a single piece, there are no rivet-heads and no inequalities, but a slight curvature at the point of juncture, which facilitates freeing the tool from wet grass, mud, or refuse. The teeth F are preferably separated by wide cusps $f$, which tend to render the former self-cleaning. The parts D and F are preferably cut from a plane or flat sheet of suitable metal, which is then bent into L shape along the line G G in the direction of its length and the blade sharpened. The extended end or point E constitutes a convenient instrument for extracting the roots of noxious weeds and for other purposes.

In operation the handle B being grasped by the operator and the device swung in the ordinary manner, the grass or other material cut by the blade D will, together with waste-paper, sticks, and other refuse lying in the path of the teeth F, be caught thereby as the blade sweeps along close to the ground and will be automatically cast into a windrow out of the way and easy of access when it becomes desirable to remove them. Especially will this automatic feature be found advantageous and valuable when cutting lawn edges, under fences, and out-of-the-way places where it has heretofore been difficult to remove the refuse without soiling the fingers or person. The tool may be reversed or turned upside down and used for raking stones, weeds, &c., as the operator proceeds, thus obviating the necessity of carrying an extra tool.

Although I have specifically described the construction and relative arrangement of the several parts of my improvement, yet I do not desire to be confined to such specific constructions, as such changes or modifications may be made as fairly fall within the field or purview of my invention.

Having thus described the nature of this invention and the best means of which I am aware for carrying the same into practical effect, I claim—

1. A device of the character described comprising a cutting-blade and rake-teeth disposed approximately at a right angle to each other.

2. A cutting and raking implement having an integral L-shaped blade and rake.

EUGENE S. REGNIER.

Witnesses:
L. M. RICHARDS,
H. M. RICHARDS.